April 28, 1936. F. T. KREIN 2,038,575
FROZEN CONFECTION AND WRAPPER THEREFOR
Filed March 14, 1934
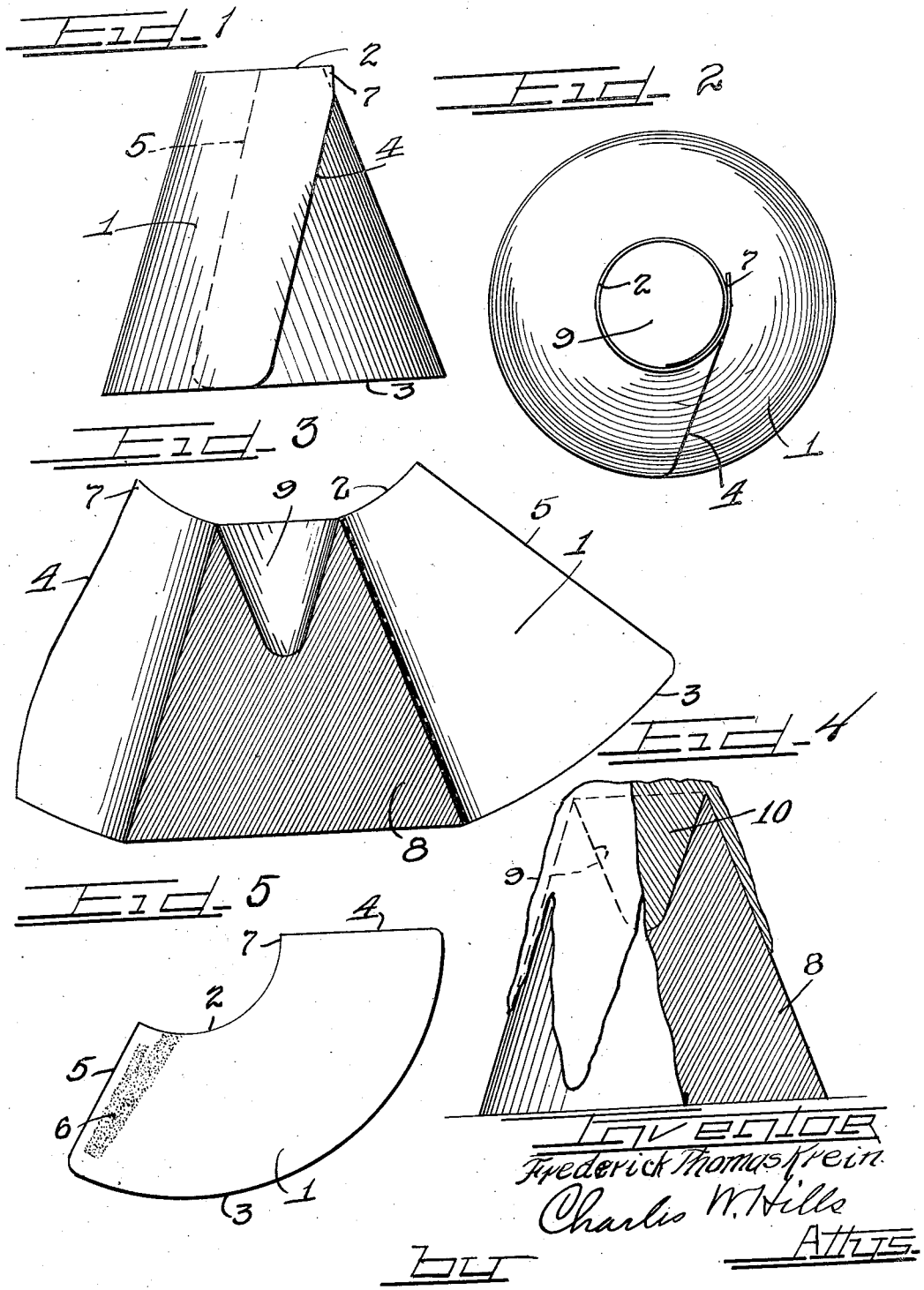

Patented Apr. 28, 1936

2,038,575

UNITED STATES PATENT OFFICE 2,038,575

FROZEN CONFECTION AND WRAPPER THEREFOR

Frederick Thomas Krein, Park Ridge, Ill., assignor to Vortex Cup Company, Chicago, Ill., a corporation of Delaware Application March 14, 1934, Serial No. 715,425

2 Claims. (Cl. 99—180)

This invention relates to improvements in a frozen confection and wrapper therefor, with particular reference to an individual portion of a frozen confection encased in a wrapper or container which is easily removable for the purpose of dispensing the confection to an ultimate purchaser, although the invention may have other uses and purposes as will be apparent to one skilled in the art.

In the dispensing of frozen confections, such as ice cream, sherberts and the like, the modern trend is for the retail dealer to receive individual portions of the confection in individual containers, and remove the container or wrapper at the time the confection is dispensed to the consumer or purchaser. Such a method results in a saving of confection to the retail dealer over the long established dispensing by the scoopful from a bulk container, and further insures that each purchaser receives the correct amount of confection and receives this confection in a wholly sanitary manner. Obviously, the wrappers on such individual portions of confection must be exceedingly easy to manipulate and remove so that the dispensing operation may be done in as short a time as possible. Heretofore some difficulty has been experienced in the removal of the wrappers, and quite frequently the server inadvertently contacted the confection with his fingers. Furthermore, it is desirous of having the confection in suitable shape for the particular purpose for which it is to be used, such as in ice cream cones, sodas, sundaes, or the like.

With the foregoing in mind, it is an object of the present invention to provide a wrapper for frozen confections which is extremely easy to manipulate and remove without any necessity for the attendant to touch the confection with his fingers and where there is little or no likelihood of the attendant accidentally touching the confection while removing the wrapper.

Another object of this invention is the provision of a wrapper for frozen confections consisting of a container of paper or similar material having overlapping margins easily separable by a slight pull upon a tear tab to completely free the wrapper from its contents, the wrapper being of such character that the confection will be left in a serving member ready for use.

It is also an object of this invention to provide a wrapper for frozen confections of such shape and character as to be ready for use in a sundae.

Still another object of this invention is the provision of a wrapper for frozen confections of a form to be used in a sundae, the wrapper being of such character as to permit flavoring media to be applied to the confection prior to the removal of the wrapper.

It is another object of this invention to provide a confection of a shape highly desirable for use in a sundae, the confection being frozen within a readily removable wrapper and also provided with an indentation for the reception of a flavoring medium in the formation of the sundae.

Also an aim of this invention is the provision of a frozen confection package, including a wrapper readily removable from the confection, and a confection frozen within the wrapper and provided with an indentation to function as a gauge for the application of a flavoring medium, in that the indentation is of such a size as to contain just sufficient flavoring medium consistent with the amount of confection for the proper formulation of a sundae.

Still a further object of this invention is the provision of a complete packaged sundae, including a readily removable wrapper containing a confection frozen therein, and also a flavoring medium frozen or congealed within an indentation in the confection.

Another object of this invention is the provision of a packaged frozen confection, including a readily removable wrapper and a confection frozen therein, the confection having an indentation therein of such shape and character that, when the indentation is filled with a flavoring medium, a slight melting of the confection will result in a gravitation of the flavoring medium over the side walls of the confection or in a manner to form a palatable dish.

While some of the more salient features, characteristics and advantages of the present invention have been above pointed out, others will become apparent from the following disclosures.

The invention includes these and other features of construction and combinations of parts hereinafter described and shown in a preferred form in the drawing, as more particularly indicated by the claims.

On the drawing:

Figure 1 is an elevational view of a package combination including a wrapper and confection embodying principles of the present invention.

Figure 2 is a top plan view of the structure shown in Figure 1.

Figure 3 is a part elevational, part vertical sectional view of the structure shown in Figures 1 and 2, showing the wrapper partially removed.

Figure 4 is an elevational view showing the confection after the removal of the wrapper and illustrating the application of a flavoring medium to the confection.

Figure 5 is a plan view of a blank used in forming the wrapper for the confection.

As shown on the drawing:

In the illustrated embodiment of this invention there is seen a blank 1 (Figure 5), which may be made of any suitable material such, for example, as paper of the type commonly used in paper drinking cups and the like. This blank is in the general form of a segment of a circle with the inner portion next the center of the circle cut away, along a curved line 2 to provide an aperture in one end of the container or wrapper into which the blank is formed. The blank also has a curved outer edge 3 for defining the mouth of the container through which the container may be initially filled with the confection. The ends of the curved edge 3 terminate in inwardly converging side edges 4 and 5, and the marginal portions adjacent these side edges are designed to be overlapped when the container is formed. One of these marginal portions, in this instance the portion adjacent the edge 5, is supplied with a suitable adhesive 6, such, for example, as crystalizing glue, of just sufficient amount and character as to properly hold the blank in container form while the confection is therein, but insufficient to preclude ready separation of the marginal portions of the blank when the container is stripped or removed in the dispensing of the confection.

Due to its particular contour and construction, the blank 1 is adapted to be rolled into a container or wrapper of the form of a truncated cone, the curved edge 3 defining the opening in the large end of the truncated cone, and the curved edge 2 defining a smaller opening at the other end. The rolling or forming operation may be effected by any suitable equipment such as is commonly used in the formation of paper drinking cups. When the blank is folded into container form, the marginal portion adjacent the edge 4 overlies the margin adjacent the edge 5 and also the adhesive 6. In the formed container the edges 4 and 5 extend substantially obliquely with respect to the axis of the container and the inner end of the margin adjacent the edge 4 extends beyond the adhesive and projects substantially tangentially to the opening defined by the edge 2 to form a tear or stripping tab 7. This tab may be easily grasped between the thumb and finger of an attendant, and a slight pull upon this tab will separate the glued marginal portions and so remove the container from its contents.

After the container is formed by rolling the blank, it is filled with a confectionery mass 8, which is frozen, congealed, or hardened within the container so that the mass will adhere to the container. The opening defined by the edge 2 of the blank provides means for a projection to enter within the blank and mold an indentation or cavity 9 in the confectionery mass contemporaneously to the hardening thereof.

After the confection has been packaged in the container, the whole is preferably kept at a temperature sufficiently low for the confectionery mass to retain its rigidity, and in one form of commercial practice, a plurality of such packaged confections are delivered to a retail dealer. Upon the request of a purchaser for a sundae, for example, it is a simple expedient for the dealer to place the packaged confection upon a suitable serving member with the indentation 9 uppermost. A simple pull upon the stripping tab 7 separates the glued marginal portions of the blank and removes the container or wrapper from the confection. Before or after the removal of the wrapper, a suitable flavoring medium, such as syrup, crushed fruits, or the like, may be poured into the indentation 9 in the confectionery mass. The indention 9 may be so sized, if desired, as to form a gauge for the application of the proper amount of flavoring medium consistent with the volume of confection. As is apparent from the disclosure in Figure 4, even though the indentation 9 be just filled with flavoring medium, the arrangement of the indentation with the sloping walls of the confectionery mass is such that upon a slight melting of the confection, the flavoring medium will gravitate over the walls of the confection to render the resultant sundae more palatable. Of course, certain variations may be made in the confection and its wrapper without departing from the principles of this invention. For example, the indentation in the confection need not of necessity be conical in shape, and the wrapper and confection proper need not of necessity be of conical shape, these shapes, however, having been found highly advantageous in giving the result desired.

It is also to be noted that a complete packaged sundae may be made by the simple expedient of filling the indentation or cavity 9 with a congealable or freezable flavoring medium, either before or after the confection mass 8 is frozen into the container. If the flavoring medium is applied before, then it will be congealed or frozen along with the confection. If it is applied after the confection has been frozen or hardened, it will, of course, be necessary to subject the packaged confection to another chilling operation in order to freeze or congeal the flavoring medium. Of course, after the flavoring medium has been so applied, the entire packaged sundae must be kept at a temperature sufficiently low to retain the flavoring medium as well as the confectionery mass 8 in a substantially rigid or thickened condition. Upon the dispensing of such a packed sundae in normal temperature conditions, upon a slight melting of the confection and flavoring medium, the flavoring medium will gravitate over the sides of the confection, thus forming a palatable sundae.

From the foregoing, it will be apparent that I have provided a novel frozen confection and wrapper therefor for use in the dispensing of frozen confections or sundae dishes. The wrapper is exceedingly easy to remove from the confection with no necessity for the attendant to contact the confection with his hands. It will also be apparent that the confection may be packaged in complete sundae form, or, if not in such a form, the confection is already adapted for use in a sundae dish and in many instances affords a gauge for the application of the right amount of flavoring medium. Further, the present invention affords a sanitary package, easy to handle, and which may be economically manufactured.

While one form of suitable container or wrapper is disclosed and described herein, the wrapper itself as such is not herein claimed, since it is the subject matter of my copending application entitled, "Frozen confection wrapper", filed July 20, 1934, Serial No. 736,200.

I am aware that many changes may be made and numerous details of construction may be varied through a wide range without departing from the principles of this invention and I, therefore, do not purpose limiting the patent granted hereon otherwise than necessitated by the prior art.

I claim as my invention:

1. A packaged frozen confection including a paper cup of the general shape of a truncated cone including a mouth at one end and a smaller opening at the other, a confectionery mass frozen in and to said container and having a cavity therein accessible for filling through the smaller end of said cup and a flavoring medium congealed in said cavity, said cup including means for enabling it to be stripped from said mass.

2. A packaged frozen confection including a paper cup of the general shape of a truncated cone including a mouth at one end and a smaller opening at the other, a confectionery mass frozen in and to said container and having a cavity therein accessible for filling through the smaller end of said cup and a flavoring medium congealed in said cavity, said cup including means for enabling it to be stripped from said mass, said cavity being conical in shape with its base at the smaller opening in said cup.

FREDERICK THOMAS KREIN.